United States Patent Office 3,087,650
Patented Apr. 30, 1963

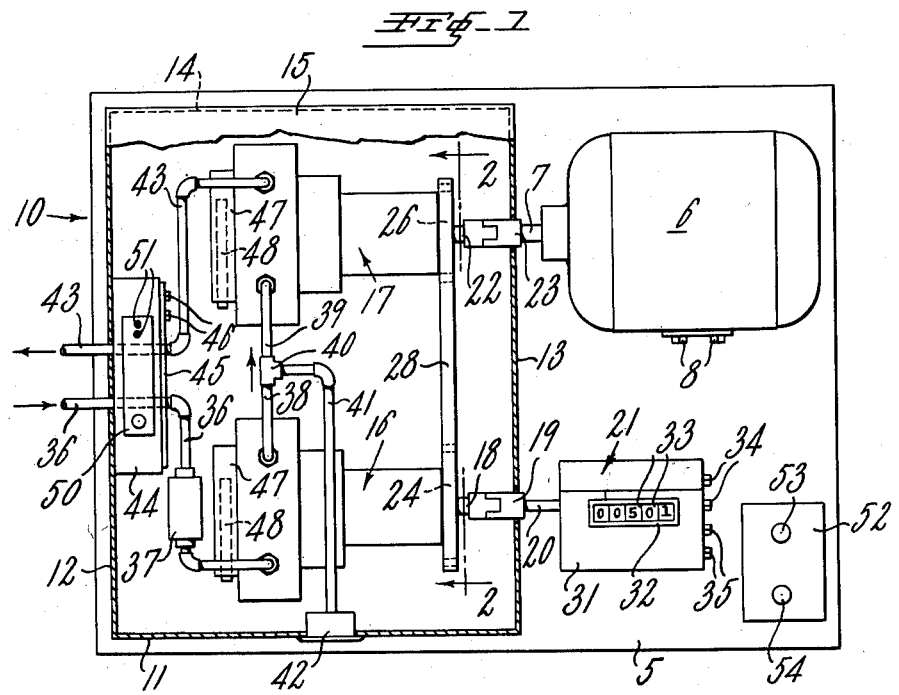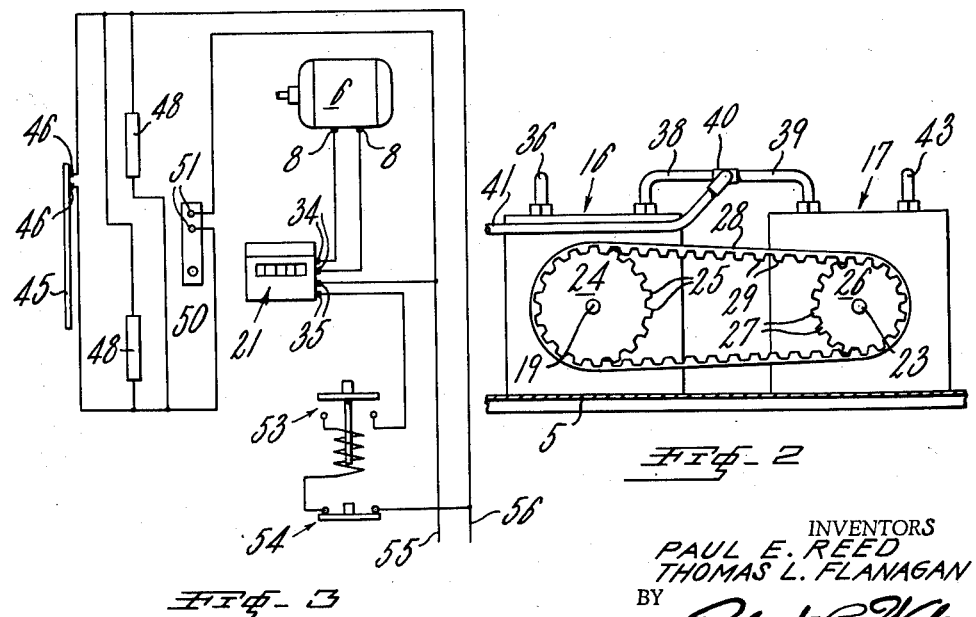

3,087,650
COMBINED METERING AND DISPENSING
APPARATUS
Paul E. Reed, New Haven, and Thomas L. Flanagan, Deep River, Conn., assignors to United States Rubber Company, New York, N.Y., a corporation of New Jersey
Filed Aug. 5, 1957, Ser. No. 676,227
3 Claims. (Cl. 222—14)

This invention relates to fluid dispensing and, more particularly, to improved apparatus for metering and dispensing predetermined quantities of a fluid material.

The apparatus of this invention has wide application and may be advantageously employed wherever it is desired to dispense predetermined quantities of liquid intermittently from a source of bulk supply. The apparatus is especially useful for accurately metering and dispensing non-abrasive liquids, such as antioxidants employed in the compounding of rubber products, modifiers, rosin soap and the like.

It is the primary object of this invention to provide improved apparatus for accurately and economically dispensing predetermined relatively small quantities of liquid materials, against widely varying pressures as required.

Another object of the invention is to provide apparatus of the character indicated which includes a positive displacement rotary meter and a positive displacement rotary pressure delivery pump, the latter being series-connected to and downstream of the meter, and driving means for actuating the meter and pump simultaneously, positively and at a fixed angular speed ratio one to another, the meter and pump driving means being so constructed and arranged that the pressure pump performs all of the pumping work while the meter performs no pumping work in operation, whereby the meter is independent of the output pressure, operates under a small constant differential pressure and any leakage therethrough is slight and constant.

Another object of the invention is to provide liquid dispensing apparatus which is simple and compact in design, which is reasonable in manufacturing and maintenance cost and which is capable of performing its intended functions in a satisfactory and trouble-free manner.

To the end that the foregoing objects may be readily attained, a preferred and recommended apparatus embodying the invention comprises a positive displacement rotary gear meter and a positive displacement gear pump, which is identical in construction to the meter, and each of which includes a rotary shaft. A first conduit transmits liquid to be metered and dispensed from a source of supply to the inlet of the meter. A second conduit connects the outlet of the meter to the inlet of the pressure pump. A predetermining counter unit is connected and rotatable with the shaft of the meter. The meter and the pump are actuated in unison by a driving means which includes an electric motor having a rotary shaft connected to the shaft of the pressure pump, a gear wheel secured to and rotatable with the shaft of the pressure pump, a gear wheel secured to and rotatable with the shaft of the meter, and a positive drive transmission belt which engages both gear wheels whereby the meter and pump are driven at a constant angular speed, said speeds bearing a fixed ratio to one another and to the rotation of the motor shaft. The gear wheel of the meter is larger than that of the pressure pump. As a consequence, the meter will operate at a slower speed, and therefore a lower displacement per unit time, than the pressure pump and a negative pressure is created in the second conduit. This results in the pressure pump performing all of the pumping work and leakage through the meter will be slight and maintained at a constant value.

These same conditions may readily be established by use of a rotary positive displacement meter and a rotary positive displacement pump of any type, and not necessarily identical, provided the constant angular speed ratio be fixed at a proper value such that the displacement per unit time of the pressure pump exceeds that of the meter.

Leakage is one of the primary variables which determine accuracy in metering. We minimize and maintain any such leakage constant in the manner indicated above.

Another variable is the viscosity of the liquid that is to be handled by the apparatus. The viscosity of the liquid is regulated by heating the liquid so as to maintain it at the desired temperature and viscosity in the course of passage through the apparatus, as will be explained further along herein.

By maintaining a constant differential pressure across the meter, leakage therethrough may be calibrated as a constant into the meter reading of the counter unit. Furthermore, this differential pressure should be kept low in practice to reduce wear on moving parts. By keeping the differential pressure to a negative value, such as —15 p.s.i., instead of a positive value, such as +50 p.s.i. or +100 p.s.i., the rate of wear is substantially reduced.

The enumerated objects and other objects, together with the advantages of the invention will be readily comprehended by persons skilled in the art from the following description and taken in conjunction with the accompanying drawing which respectively describe and illustrate a preferred apparatus constructed in accordance with the invention.

In the drawing, wherein like reference numerals denote corresponding parts throughout the several views:

FIG. 1 is a top plan view of an arrangement of apparatus constructed in accordance with this invention, certain parts being broken away for better illustration of other parts;

FIG. 2 is a view taken along line 2—2 of FIG. 1; and

FIG. 3 is a diagrammatic representation of an electric circuit that is embodied in the invention.

Referring initially to FIG. 1, the apparatus includes a base 5 which supports an electric motor 6 that has a rotary shaft 7 and a pair of electrical terminals 8. Adjacent the motor is a casing 10 for housing a number of devices that will be described further along herein. The casing comprises a front wall 11, a pair of side walls 12 and 13, a rear wall 14 and a removable top 15.

Positioned within casing 10 is a positive displacement meter 16 and a pressure delivery pump 17. The pump 17 is of the rotary gear type and the construction of the meter 16 is identical to that of the pump. The meter and pump are arranged in tandem and are adapted to be driven in unison by motor 6 and associated devices, as will be described. Meter 16 has a rotary shaft 18 which is connected by a flexible coupling 19 to the shaft 20 of a predetermining counter unit 21 that is mounted on base 5 exterior of the casing and forward of the motor. Pressure pump 17 has a like shaft 22 which is connected by a flexible coupling 23 to motor shaft 7.

A first gear wheel 24, having teeth 25, is secured to and rotatable with meter shaft 18. A second gear wheel 26, having teeth 27, is secured to and rotatable with pump shaft 22. Gear wheel 26 is smaller in diameter than gear wheel 24 and has a correspondingly fewer number of teeth than does gear wheel 24. An open transmission belt 28 is provided with teeth 29 which mesh with the teeth of the gear wheels to effect rotation of shaft 22 when motor 6 is in active service. Belt 28 is referable to the type described in R. Y. Case Patent No. 2,507,852, dated May 16, 1950, and entitled "Transmission Belt and Drive," to which reference may be had for further details. It will be apparent from the foregoing that the meter 16 and pump 17 are driven in unison due to the arrangement of gear wheels 24 and 26 and belt 28. Inasmuch as gear wheel 26 is smaller than gear wheel 24, pressure pump 17 will operate at a higher speed than meter 16 in practice.

Predetermining counter unit 21 registers the revolutions of the meter 16 and serves as a means for controlling operation of motor 6 and, therefore, of the meter and the pump. This unit includes a housing 31 having a window 32 for viewing a plurality of counting wheels 33 and a plurality of predetermining wheels (not shown), each of which is provided with peripheral indicating numerals. Unit 21 also includes a first pair of electrical terminals 34, a second pair of electrical terminals 35 and suitable electric switches (not shown). Unit 21 is preferably of a type manufactured by Veeder-Root, Incorporated, Hartford, Connecticut. It is deemed sufficient to state here that (a) the predetermining wheels are adapted to be manually set to the exact desired number of turns of shafts 20 and (b) a switch within the unit opens an electric circuit to motor 6 when the counting wheels read the same as the setting of the predetermining wheels, thereby causing the motor to stop.

Liquid to be metered and dispensed by the apparatus of this invention is transmitted from a source (not shown) to the inlet of meter 16 by a conduit 36 which has a strainer 37 interposed therein. The outlet of the meter communicates with the inlet of pressure pump 17 by way of a conduit which includes pipe sections 38 and 39 and a T-connector 40. A branch conduit 41 establishes communication between T-connector 40 and a vacuum gauge 42 which is mounted in casing front wall 11. A conduit 43 is connected to the outlet of the pressure pump and extends through casing side wall 12. This conduit serves to transmit liquid discharged by the apparatus to any desired location for use, as required.

The temperature of the liquid passing through the apparatus and therefore the viscosity of such liquid are controlled by heating means that will now be described. As indicated in FIG. 1, portions of conduits 36 and 43 extend through and are in intimate contact with a block 44. This block is made of a suitable heat conductive material, such as an appropriate metal, and is mounted on casing side wall 12. An electrical heating strip element 45, having a pair of terminals 46, is positioned directly against a surface of block 44 and is adapted to heat the same. Referring to the meter 16 and pump 17, each is provided with a heat conductive mounting unit 47 which carries a corresponding cartridge type electric heater 48. Sufficient heat is supplied by heating element 45 and cartridge heaters 48 to properly regulate the viscosity of the liquid. The temperature of the heating element and of the cartridge heaters is controlled by an adjustable thermostat 50 which is positioned on the top of block 44. The thermostat is provided with a pair of electrical terminals 51.

A switch panel 52 carries a starting switch 53 and an emergency switch 54. The starting switch is normally open and is a conventional solenoid switch. The emergency switch is normally closed and may be of any suitable type mechanical switch. Panel 52 is mounted on base 5 adjacent counter unit 21 and forward of motor 6 to permit of ready access to the switches.

FIG. 3 represents a circuit diagram for the electrical energization and control of various devices, earlier described. The illustrated circuitry includes a pair of conductor wires 55 and 56 which are adapted to be connected to a suitable source of electrical energy supply (not shown). FIG. 3 shows the electric connections and the condition of the circuits when the apparatus is out of active service, starting switch 53 being in its normal open position and emergency switch 54 being in its normal closed position.

For the purpose of outlining the operation of the illustrated embodiment of the invention, it is assumed that starting switch 53 is open and emergency switch 54 is closed, as shown in FIG. 3. It is also assumed that the parts are at the desired temperature and that the apparatus has been primed with the liquid which is to be metered and dispensed thereby. The predetermining wheels of counter unit 21 are set to a number corresponding to the desired volume of liquid which the apparatus is to meter and dispense. The counting wheels of unit 21 are set to zero.

Starting switch 53 is now closed, thereby placing motor 6 and meter 16 and pump 17 in active service. Due to the difference in size of gear wheels 24 and 26, the pressure pump will operate with greater volumetric capacity than the meter. This results in a throttled feed for the pressure pump and creation of a negative pressure between the meter and pump. Such pressure is indicated by gauge 42. Actual pumping is performed by pressure pump 17. The meter and pump are so constructed and arranged that the meter operates under a small constant pressure differential. As a consequence, any leakage through the meter will be slight and constant. By maintaining a small constant differential pressure across the meter, leakage may be calibrated as a constant in the setting of the counter unit.

When the counting wheels of the counter unit read the same as the setting of the predetermined wheels, the apparatus will have handled the selected volume of liquid and the counter unit automatically opens a switch (not shown), thereby stopping motor 6 and the meter and pump and causing starting switch 53 to return to its normal open position. To again dispense the same volume of liquid, it is merely necessary to reset the counter wheels to zero and reclose the starting switch.

In the event of an emergency, switch 54 is opened manually, thereby interrupting the supply of electricity to motor 6 and causing the motor and the meter and pump to cease operating. At such times, the starting switch will function automatically and move to its normal open position.

From the foregoing, it is believed that the construction, operation and advantages of our present invention will be readily comprehended by persons skilled in the art. It is to be clearly understood, however, that various changes in the apparatus set forth above may be made without departing from the scope of the invention, it being intended that all matter contained in the description or shown in the drawing shall be interpreted as illustrative only and not in a limiting sense.

Having thus described our invention, what we claim and desire to protect by Letters Patent is:

1. An apparatus for metering and dispensing liquids comprising a positive displacement rotary meter and a positive displacement rotary pressure delivery pump, an inlet and an outlet for each of said meter and said pump, the inlet for said meter being adapted to be connected to a source of liquid to be metered and dispensed and its outlet being connected to the inlet for said pressure delivery pump, means for driving said meter and said pump at a constant ratio between their rates of rotation, said pressure delivery pump having a greater delivery capacity of liquid than said meter when said meter and said pump are being driven, whereby the pressure on the liquid in the outlet of said meter will be less than the pressure at its inlet and a substantially constant volume of liquid will be delivered from the outlet of said pump per revolution of said meter, and means responsive to said means for driving said meter and said pump to record the cumulative number of revolutions of said meter and thereby indicate the volume of liquid delivered by said meter.

2. An apparatus for metering and dispensing liquids comprising a positive displacement rotary meter and a positive displacement rotary pressure delivery pump, an inlet and an outlet for each of said meter and said pump, the inlet for said meter being adapted to be connected to a source of liquid to be metered and dispensed and its outlet being connected to the inlet for said pressure delivery pump, means for driving said meter and said pump at a constant ratio between their rates of rotation, said pressure delivery pump having a greater delivery capacity of liquid than said meter when said meter and said pump are being driven, whereby the pressure on the liquid in the outlet of said meter will be less than the pressure at its inlet and a substantially constant volume of liquid will be delivered from the outlet of said pump per revolution of said meter, means responsive to said means for driving said meter and said pump to record the cumulative number of revolutions of said meter and thereby indicate the volume of liquid delivery by said meter, and means for interrupting the operation of said means for driving said meter and said pump after a predetermined number of revolutions of said meter.

3. An apparatus for metering and dispensing viscous liquids comprising a positive displacement rotary gear meter and a positive displacement rotary gear pressure delivery pump, an inlet and an outlet for each of said meter and said pump, the inlet for said meter being adapted to be connected to a source of liquid to be metered and dispensed and its outlet being connected to the inlet for said pressure delivery pump, means for regulating the temperature of the liquid passing through said meter and said pump, means for driving said meter and said pump at a constant ratio between their rates of rotation, said pressure delivery pump having a greater delivery capacity of liquid than said meter when said meter and said pump are being driven, whereby the pressure on the liquid in the outlet of said meter will be less than the pressure at its inlet and a substantially constant volume of liquid will be delivered from the outlet of said pump per revolution of said meter, means responsive to said meter and said pump driving means to record the cumulative number of revolutions of said meter and thereby indicate the volume of liquid delivered by said meter, and means for interrupting the operation of said means for driving said meter and said pump after a predetermined number of revolutions of said meter.

References Cited in the file of this patent

UNITED STATES PATENTS

| | | |
|---|---|---|
| 1,328,101 | Pressler | Jan. 13, 1920 |
| 1,457,220 | Ferrer | May 29, 1923 |
| 1,734,779 | Randolph | Nov. 5, 1929 |
| 1,929,231 | Yirava | Oct. 3, 1933 |
| 1,952,882 | Morgan | Mar. 27, 1934 |
| 2,242,714 | Willson | May 20, 1941 |
| 2,360,408 | Dunn et al. | Oct. 17, 1944 |
| 2,507,852 | Case | May 16, 1950 |
| 2,550,942 | Spangler | May 1, 1951 |
| 2,795,240 | Miller | June 18, 1957 |

FOREIGN PATENTS

| | | |
|---|---|---|
| 12,981 | Great Britain | June 2, 1909 |